UNITED STATES PATENT OFFICE.

CHARLES SCHREBLER, OF METHUEN, MASSACHUSETTS, ASSIGNOR, BY MESNE ASSIGNMENTS, TO THE OWASCO COMPANY, OF PORTLAND, MAINE.

PROCESS OF CARBONIZING VEGETABLE MATTER IN WOOL.

SPECIFICATION forming part of Letters Patent No. 380,599, dated April 3, 1888.

Application filed October 31, 1887. Serial No. 253,872. (No specimens.) Patented in Canada May 6, 1887, No 26,625, and in England June 15, 1887, No. 8,575.

*To all whom it may concern:*

Be it known that I, CHARLES SCHREBLER, of Methuen, in the county of Essex and State of Massachusetts, have invented certain new and useful Improvements in the Art of Carbonizing Vegetable Matter in Wool, of which the following is a specification.

My invention relates to those modes or processes of and means for treating wool for the removal of burrs and other vegetable substances involving the use of chemicals, and in which the foreign vegetable matter is carbonized and subsequently granulated or pulverized and blown out of the wool.

It is the object of my invention to so improve the art of "carbonizing" the vegetable matter in and removing the same from wool as not to affect the color or color-taking properties of the wool or its softness or other natural characteristics, such improvement consisting in first treating the wool with an acid solution of any suitable kind used in carbonizing processes in order to assist in the decomposition and destruction of burrs or other vegetable substances in the wool; then subjecting the wool to a current of fresh dry air for the purpose alone of thoroughly drying the wool, the air, in such act of drying the mass, not being heated to a degree sufficient to effect the generation of gases or the sweating of the wool, or to cause the chemicals or gases to "set" upon the wool or to carbonize the vegetable matter therein; then, after the wool is thoroughly dried, as aforesaid, subjecting it to a current of dry air sufficiently hot to effect a carbonization of the vegetable matter therein, and, finally, breaking up or granulating such carbonized vegetable matter and "dusting" it out of the wool.

The objection to carbonizing processes heretofore practiced has been that the acid solutions and heat employed to carbonize the vegetable matter have operated to detrimentally affect the natural character, color, and color-taking properties of the wool. While some carbonizing processes are so performed as that the wool will take black and some of the primary colors fairly well, it cannot be successfully dyed with some of the colors and shades in which it is desirable to use it, so as to make it as serviceable as wool which has not been subjected to a carbonizing process. Again, the acid solutions and heat have to a greater or less extent injuriously affected the natural softness and strength of the wool.

In all carbonizing processes heretofore followed, so far as I am aware, heat and the chemical solutions have been employed in unison to effect the carbonization of the vegetable matter—that is, a quite high degree of heat has been employed while the wool was either wet or damp with the acid solution—and when this is done carbonization of the vegetable matter cannot be effected short of damaging the wool.

I have discovered that if the wool is first thoroughly dried after being treated to an acid solution under a temperature preferably not exceeding summer heat the vegetable matter therein can be carbonized at a temperature safely short of that which would injure its natural character, color, and color-taking properties, and also that when the heat for effecting carbonization of the vegetable matter is not applied until after the wool has been thoroughly dried a much weaker acid solution may be employed than where the heat and acid solutions are employed together, the strength of the acid solution in the former case being safely short of such as would have a damaging effect upon the wool.

In carrying out my invention I first treat the wool with an acid solution of any kind used in carbonizing processes, making sure that such solution is not of a strength sufficient to act with a damaging effect upon the wool. I then draw or force a current of dry air through the wool, preferably having the air warmed to a temperature about equal to summer heat, in order to effect the drying speedily. In this way I avoid the sweating of the wool and the generation of gases from the chemicals and dampness in the wool, and so prevent any damage in any way thereto. After the wool has been thoroughly dried I subject it to a current of dry air heated to a temperature of about 175° or 180° Fahrenheit, which is sufficient to effect a thorough and complete carbonization of all vegetable matter in the wool in about one-half hour. This carbonizing heat is employed for a comparatively short time, and is not sufficient to damage the wool in any way. After treatment of the wool as aforesaid the vegetable matter therein will be so far decomposed or destroyed as to permit it to be broken up or granulated and dusted out of the wool.

The distinguishing features of my improvement reside in the mode of procedure whereby, in one step, the thorough drying alone of the wool is effected at a temperature preferably not above summer heat, so as to avoid sweating the wool or generating damaging gases therein, and in a subsequent step the "carbonization," so called, of the vegetable matter in the wool is alone accomplished at a higher temperature, but a temperature not sufficiently high to damage the wool.

In carrying out my improved process I may employ the machine shown and described in an application filed by me July 18, 1887, or any other suited to the purpose.

Wool treated in accordance with my improved process will be entirely unaffected as to its color, color-taking properties, and natural character.

What I claim is—

1. The improvement in the art of treating wool for the purpose of destroying or carbonizing the vegetable substances therein, which consists in first treating the wool with a weak acid solution, then drawing or forcing a current of warm dry air through the entire mass or body of the wool and discharging such air in order to thoroughly dry the wool, and subsequently subjecting the entire mass to a current of hot dry air to carbonize the vegetable matter in the mass, substantially as set forth.

2. The improvement in the art of treating wool for the purpose of carbonizing or destroying the vegetable substances therein, which consists in treating the wool with a weak acid solution, then subjecting the entire mass to a current of dry air warmed to a temperature of about 75° or 80° Fahrenheit to thoroughly dry the wool, and subsequently subjecting the mass to a current of dry air heated to a temperature of about 175° or 180° Fahrenheit to destroy or carbonize the vegetable matter in the wool, substantially as set forth.

In testimony whereof I have signed my name to this specification, in the presence of two subscribing witnesses, this 27th day of October, 1887.

CHARLES SCHREBLER.

Witnesses:
ARTHUR W. CROSSLEY,
C. F. BROWN.